United States Patent [19]

Török

[11] Patent Number: 4,751,416

[45] Date of Patent: Jun. 14, 1988

[54] SYNCHRONOUS SERVOMOTOR

[75] Inventor: Vilmos Török, Lidingö, Sweden

[73] Assignee: AB ELMO, Flen, Sweden

[21] Appl. No.: 852,949

[22] PCT Filed: Sep. 2, 1985

[86] PCT No.: PCT/SE85/00327

§ 371 Date: Apr. 11, 1986

§ 102(e) Date: Apr. 11, 1986

[87] PCT Pub. No.: WO86/01652

PCT Pub. Date: Mar. 13, 1986

[30] Foreign Application Priority Data

Aug. 31, 1984 [SE] Sweden ............................. 8404354

[51] Int. Cl.$^4$ ............................................. H02K 21/12
[52] U.S. Cl. ...................................................... 310/156
[58] Field of Search ........... 310/67, 152, 156, 162-165

[56] References Cited

U.S. PATENT DOCUMENTS

| | | | |
|---|---|---|---|
| 3,860,843 | 1/1975 | Kawasaki | 310/67 |
| 4,280,072 | 7/1981 | Gotou | 310/156 X |
| 4,438,362 | 3/1984 | Brown | 310/156 X |
| 4,504,755 | 3/1985 | Semones | 310/156 |

Primary Examiner—Donovan F. Duggan
Attorney, Agent, or Firm—Browdy and Neimark

[57] ABSTRACT

A synchronous servomotor has a slotted stator core (7) with windings placed in the slots (8) thereof, and a rotor core (5) having magnetic poles formed by permanent magnets (6) attached to the core (5). For the purpose of reducing the reluctance torque, at least certain poles are displaced from the positions which correspond to fully uniform distribution of the poles around the rotor core through a displacement angle which corresponds to a fraction of the slot pitch in the stator core. Mutually, different poles are advantageously displaced from the positions corresponding to fully uniform pole distribution through mutually different angles, although in a manner such that the magnetic forces acting on the rotor core balance one another. The permanent magnets (6) attached to the rotor core ad forming the magnetic poles are suitably of substantially uniform thickness and of arcuate configuration havng a curvature of radius which is smaller than the radial distance of the permanent magnets from the rotary axis of the rotor core.

9 Claims, 2 Drawing Sheets

SYNCHRONOUS SERVOMOTOR

The present invention relates to a synchronous servomotor of the kind which comprises a stator with a stator core provided with slots and a winding placed therein, and a rotor with a rotor core and field poles in the form of permanent magnets attached to the rotor core and located in the air gap between the stator core and the rotor core.

Synchronous servomotors of this kind give rise to a problem generally referred to as reluctance torque or reluctance cogging, which is caused by magnetic interaction between the permanent magnetic poles on the one hand and the slots and interlying teeth in the stator core on the other. This magnetic interaction, which is completely independent of the current flowing in the stator winding and is therefore present even when no current passes therethrough, gives rise to a varying or pendulous torque on the rotor when the rotor is rotated in the stator, this torque variation being superposed on the driving torque generated by the current in the stator winding. In actual fact, when no current flows through the stator winding, the rotor exhibits a number of preference positions which the rotor strives to take, this number being dependent on the number of poles of the motor. This phenomenon causes the motor to run unevenly and results in deviations from desired motor speeds, the absolute magnitude of the effect on the speed of the motor being inversely proportional to motor speed and therewith being particularly noticeable at low speeds. Consequently, the reluctance torque or reluctance cogging constitutes a particularly serious problem in servomotors which must be capable of being driven very precisely with an extremely wide range of speeds, and also at very low speeds.

Endeavours have been made to overcome this problem, by using a smooth stator core without winding slots and by placing the stator winding on the smooth inner surface of the stator core, the winding being wound with the aid of a special winding technique. With this solution, however, the stator winding takes up a substantial part of the air gap between the stator core and the rotor core, which means that the air gap must be made larger, resulting in poor use of machine dimensions. Another known method of reducing the reluctance torque is to design the motor with skewed slots and/or field poles. Although both of these solutions provide an acceptable reduction of the reluctance torque they are encumbered with other drawbacks. For example, when using permanent magnets the use of skewed poles is mechanically difficult and relatively expensive to put into effect. The use of skewed slots for the stator winding also gives rise to certain difficulties in conjunction with the manufacture of the stator winding, particularly since it is desirable that this can be done mechanically.

Consequently, an object of the present invention is to provide a synchronous servomotor of the kind described in the introduction in which the reluctance torque or reluctance cogging is greatly reduced in a simpler and, from the aspect of manufacturer, a far less expensive manner than has hitherto been possible.

The characterizing features of the servomotor according to the invention are set forth in the following claims.

The invention will now be described in more detail with reference to the accompanying drawings, in which.

The fundamental concept of the invention resides in the displacement of certain poles relative to positions which correspond to uniform pole distribution by an angle corresponding to a fraction of the pitch of the stator core slots instead of distributing the poles of the motor uniformly around the motor periphery in the conventional manner. At least some of the rotor pole pitches will thus deviate from the value $360°/p$, where p is the number of motor poles. Because at least some of the motor poles are displaced or offset from the positions corresponding to fully uniform distribution of the poles around the rotor, different poles will occupy different positions in relation to the slots and teeth of the stator core thereby, when seen in total, equalising the magnetic interaction between the magnetic poles and the slots and interlying teeth in the stator core, and reducing the afore-discussed torque variation, the so-called reluctance cogging or reluctance torque, upon rotation of the rotor in the stator. In this respect the best result is obtained when,if possible, the various field poles are offset or displaced by angular values of mutually different magnitudes from the positions corresponding to a totally uniform pole distribution. The principle on which the invention is based can be illustrated with the aid of FIG. 1, which illustrates schematically the distribution or positioning of the poles of a 4-pole motor constructed in accordance with the principle on which the invention is based, in which figure full line arrows show the directions of the direct axes of the poles, whereas the broken lines illustrate corresponding directions in a conventional motor in which the poles are uniformly positioned. As will be seen from FIG. 1, in the case of a 4-pole motor constructed in accordance with the fundamental principle of the invention, three of the poles are displaced from these positions which correspond to uniform pole distribution, the poles being displaced to mutually different extents, and advantageously to extents corresponding respectively to $t/4$, $t/2$, and $3t/4$ where t is the slot pitch in the stator core. The magnitude of pole adjustment can thus be expressed as $k \cdot t/p$ where t is the slot pitch of the stator core, p is the number of poles of the motor, and k is an integer which is smaller than p and of differing magnitude in respect of the mutually different offset positions of the poles. In theory this provides the best possible result with respect to reduction of the reluctance torque.

Figure 1:
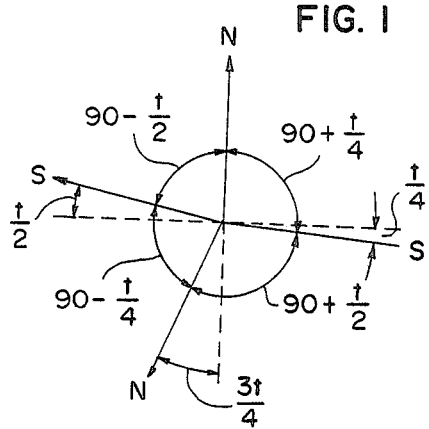
FIGS. 1-6 are schematic diagrams illustrating the basic principle of the invention and advantageous embodiments thereof.

It will be seen, however, that in the case of a motor arrangement of the kind illustrated in FIG. 1, the magnetic forces acting on the rotor are not balanced, resulting in magnetic lateral pull on the rotor, which is unacceptable in the majority of cases.

Figure 2:
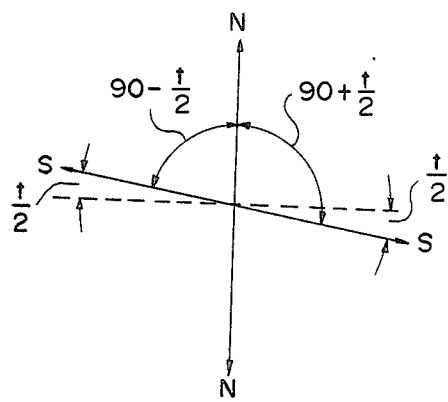
Figure 3:
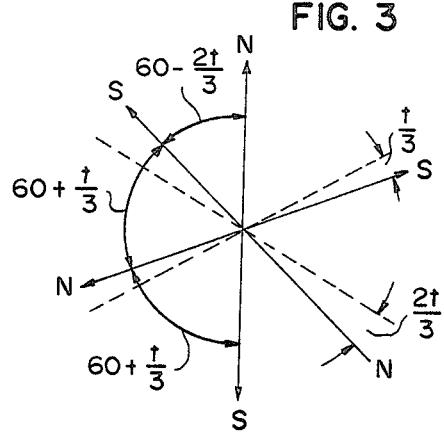
Figure 4:
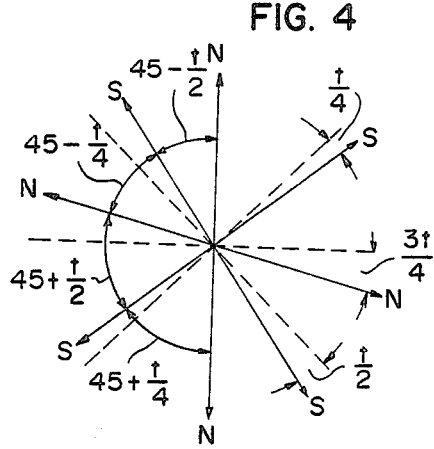

This drawback can be avoided, however, by displacing the poles in the manner illustrated in FIGS. 2, 3 and 4 with regard to a 4-pole, a 6-pole, and an 8-pole motor respectively. In this embodiment of the invention two diametrically opposed poles are always displaced from the positions corresponding to complete uniformity in pole distribution to mutually the same extent and in mutually the same direction, thus in the case of a 4-pole motor one pair of mutually diametrically opposed poles will be displaced in relation to the said positions, as illustrated in FIG. 2, whereas in the case of motor having 6 or 8 poles two or three pairs of poles, respectively, are displaced relative to said positions, as shown in respective FIGS. 3 and 4.

The extent to which the diametrically opposed poles of each pair are displaced advantageously corresponds to the value of k·2t/p, where t is the pitch of the stator slots, p is the motor pole number and k is an integer which is smaller than p/2 and which is different for the different pole pairs being displacement.

Figure 5:
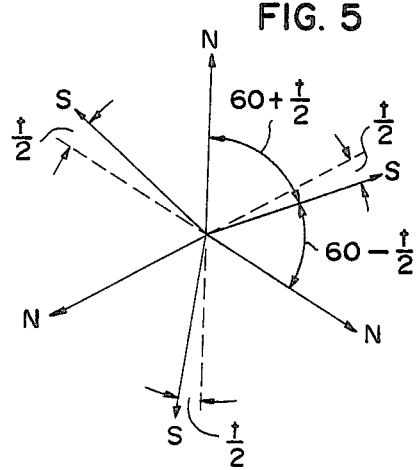
Figure 6:
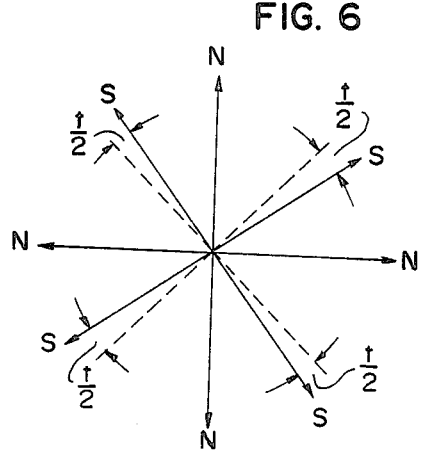

Although the afore-mentioned pole positions illustrated by way of examples in FIGS. 2–4 afford theoretically the best result with regard to the desired reduction in the reluctance torque of the motor, a fully satisfactory result can, in many cases, be achieved in a somewhat simpler manner with respect to motors which incorporate four or more poles. Thus, as illustrated in FIGS. 5 and 6, in the case of a respective 6-pole and 8-pole motor, each alternate pole is displaced from the position which corresponds to a fully uniform pole distribution. In this case, all of the displaced poles are offset at mutually equal distances from the aforesaid positions, preferably through an angle corresponding to t/2, and in mutually the same direction. This positioning of the poles will also ensure that the magnetic forces acting on the rotor are balanced, so as to avoid magnetic lateral pull on the rotor.

It can also be mentioned that the pole displacement effected when practising the invention does not unduly influence the winding factor of the motor, and hence does not lower the efficiency of the motor to any appreciable extent.

Pole displacement in accordance with the present invention can be advantageously combined with the aforementioned known concept of skewed stator slots in a synchronous servomotor. These two features co-act in a highly advantageous manner to provide the desired reduction in the reluctance torque of the motor. When both of these features or measures are incorporated the motor reluctance torque is completely eliminated for all practical purposes.

Similar to skewed stator slots a pole displacement according to the invention results in a decrease in the slot ripple in the induced voltage of the motor. This is of minor interest in the case of synchronized servomotors, since the slot ripple of the induced voltage is of subordinate significance in this type of machine.

A much more significant feature with respect to the present invention is that the displacement of the rotor poles formed by permanent magnets can be effected very simply, without adding to the costs of manufacturing the motor.

Figure 7:
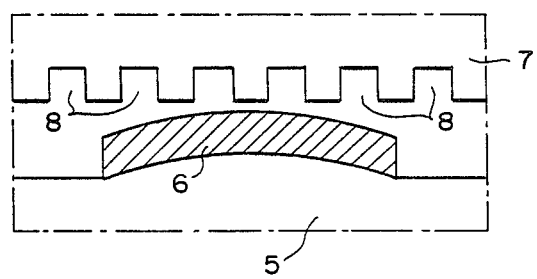
FIG. 7 illustrates schematically an advantageous embodiment of the permanent magnet poles of a servomotor according to the invention.

A further improvement can be achieved in synchronous servomotors of the kind to which the invention relates with regard to the desired reduction in reluctance cogging and the torque pulsation caused thereby, by giving the permanent magnets forming the rotor poles a particular form. FIG. 7 illustrates schematically part of the rotor core 5 of a synchronous servomotor having mounted thereon a permanent magnet 6 which forms a field pole, the rotor core part being straightened out from its normally cylindrical configuration for illustration purposes. The figure also illustrates part of the stator core 7 and its winding slots 8 located opposite the illustrated part of the rotor core 5. As illustrated in FIG. 7, according to one advantageous further development of the invention the permanent magnet 6 forming a rotor pole is of substantialy uniform thickness and of arcuate configuration with a radius of curvature which is smaller than the radial distance of the permanent magnet 6 from the axis of rotation of the rotor core 5. Consequently the air gap between the rotor core 5 and the stator core 7 is much greater at the side edges of the permanent magnet 6, and therewith at the side edges of the field pole and in the pole gaps than at the centre region of the field pole. This also contributes towards a reduction in the reluctance cogging of the motor. It will be noted in this connection that because of the low permeability of modern permanent-magnet material, the permanent magnet 6 from the aspect of magnetic flux can be generaly equated with an air gap. This particular configuration of the permanent magnet 6 forming the rotor poles of the machine also affords the additional highly beneficial advange that the quadrature flux in the motor becomes much smaller as a result of the increased air gap in the pole gaps. Consequently a larger maximum torque can be developed by the motor without requiring additional expensive permanent-magnet material. At the same time there is also obtained a straighter torque-current characteristic of the motor.

Figure 8:
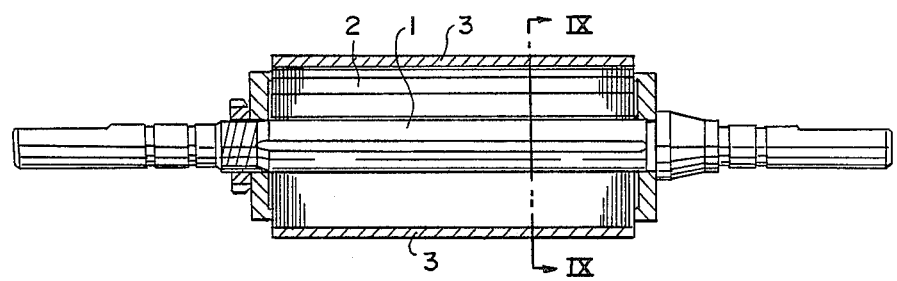
FIG. 8 is a schematic axial sectional view of a 4-pole servomotor constructed in accordance with the invention.
Figure 9:
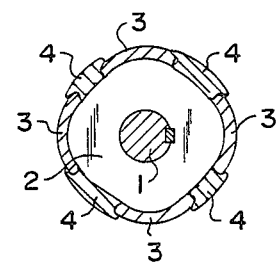
FIG. 9 is a schematic sectional view taken on the line IX—IX in FIG. 8.

FIGS. 8 and 9 illustrate schematically and by way of example the rotor of a 4-pole synchronous servomotor constructed in accordance with the invention. The rotor has a shaft 1 on which there is mounted a laminated rotor core 2. The field poles of the rotor 4 are formed by permanent magnets 3 which are held in position by means of holders 4, made for example of aluminum or some other suitable non-magnetic material. Alternatively, the permanet magnets may be attached to the rotor core 2 with the aid of a suitable adhesive and/or by taping.

The permanent magnets 3 are positioned in the afore-described manner illustrated in FIG. 2 and have the configuration illustrated in FIG. 7 and described above, having a radius curvature which is substantially smaller than the circumferential radius of the rotor core 2, i.e. smaller than the radial distance of the permanent magnets from the rotational axis of the rotor.

I claim:

1. A synchronous servomotor comprising
    a stator with a slotted stator core and stator windings located in the slots in said core, and
    a rotor with a rotor core and field poles comprising permanent magnets mounted on the rotor core and located in an air gap between the stator core and the rotor core,
    wherein respective ones of said poles are displaced from positions corresponding to fully uniform distribution of the poles around the rotor through an angle which corresponds to a fraction of the slot pitch in the stator core, such that the pole pitch between mutually adjacent poles differs from that of 360°/p, where p is the number of said poles.

2. A synchronous servomotor according to claim 1, wherein mutually different ones of said permanent magnet field poles are displaced through mutually different angles from said positions corresponding to a fully uniform peripheral spacing of the poles around the rotor.

3. A synchronous servomotor according to claims 1 or 2, wherein the displaced poles are displaced through angles corresponding to k·t/p, where t is the slot pitch of the stator core and k is an integer smaller than p.

4. The servomotor of claim 1, wherein the number of said field poles is even, and, with the exception of one pair of said mutually diametrically opposed permanent magnet field poles, each of the remaining pairs of diametrically opposed permanent magnet field poles is displaced from a position corresponding to a fully uniform peripheral spacing of the field poles around through an angle corresponding to a fraction of the slot pitch in the stator core.

5. The servomotor of claim 4, wherein said angle of displacement has a value of k·2t/p, where t is the slot pitch of the slot pitch of the stator core and k is an integer which is smaller than p/2 and which is mutually different for different ones of said displaced pairs of diametrically opposed permanent magnet field poles.

6. The servomotor of claim 1, wherein each alternate one of said permanent magnet field poles is displaced from a position corresponding to a fully uniform peripheral spacing of the permanent magnet field poles around said rotor through an angle corresponding to a fraction of the slot pitch in the stator core, the angle of displacement and the direction thereof being the same for all said alternate permanent magent field poles.

7. The servomotor of claim 6, wherein said displacement angle has a value of t/2, where t is the slot pitch in the stator core.

8. The servomotor of claim 1, wherein the slots in the rotor core are skewed.

9. The servomotor of claim 1, wherein each of the permanent magnets forming said field poles of said rotor has a substantially uniform radial thickness and an arcutate configuration with a radius of curvature which is smaller than the radial distance of the permanent magnet from the rotor axis of said rotor core, such that the radial distance between the rotor core and the stator core is substantially greater at the side edges of the permanent magnets and in the pole gaps than at the center of the permanent magnets.

* * * * *